United States Patent
Yang et al.

(10) Patent No.: US 8,438,397 B2
(45) Date of Patent: May 7, 2013

(54) WATERMARKING FOR COMPRESSED SCALABLE CODED BITSTREAMS

(75) Inventors: Zhijie Yang, Beijing (CN); Wade Wan, Orange, CA (US); Brian Heng, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 982 days.

(21) Appl. No.: 12/477,999

(22) Filed: Jun. 4, 2009

(65) Prior Publication Data

US 2010/0313030 A1 Dec. 9, 2010

(51) Int. Cl.
*H06L 9/32* (2006.01)

(52) U.S. Cl.
USPC ........... 713/176; 713/181; 380/201; 380/202; 380/210; 283/17; 283/113; 382/100

(58) Field of Classification Search .................. 713/176, 713/181; 380/210; 725/25; 283/17, 113; 382/100; 308/201, 202, 210
See application file for complete search history.

(56) References Cited

U.S. PATENT DOCUMENTS

| | | | |
|---|---|---|---|
| 5,875,249 A * | 2/1999 | Mintzer et al. .................. 380/54 |
| 6,865,677 B1 * | 3/2005 | Echizen et al. ............... 713/176 |
| 7,389,420 B2 * | 6/2008 | Tian ............................... 713/176 |
| 7,428,639 B2 * | 9/2008 | Demos .......................... 713/176 |
| 7,519,823 B1 * | 4/2009 | Schumacher et al. ........ 713/176 |
| 8,059,815 B2 * | 11/2011 | Lofgren et al. ............... 380/201 |
| 8,150,096 B2 * | 4/2012 | Alattar .......................... 382/100 |
| 2003/0123659 A1 * | 7/2003 | Forstrom et al. ............. 380/205 |
| 2003/0128845 A1 * | 7/2003 | Kudumakis ................... 380/210 |
| 2003/0172274 A1 * | 9/2003 | Hsia et al. ..................... 713/176 |
| 2003/0185417 A1 * | 10/2003 | Alattar et al. ................. 382/100 |
| 2004/0003394 A1 * | 1/2004 | Ramaswamy .................. 725/28 |
| 2004/0044894 A1 * | 3/2004 | Lofgren et al. ............... 713/176 |
| 2004/0059918 A1 * | 3/2004 | Xu ................................. 713/176 |
| 2004/0131184 A1 * | 7/2004 | Wu et al. ....................... 380/202 |
| 2006/0053292 A1 * | 3/2006 | Langelaar ..................... 713/176 |
| 2006/0280246 A1 * | 12/2006 | Alattar et al. ............. 375/240.15 |
| 2010/0046606 A1 * | 2/2010 | Celik et al. ............... 375/240.01 |
| 2010/0080413 A1 * | 4/2010 | Chen et al. .................... 382/100 |
| 2010/0313030 A1 * | 12/2010 | Yang et al. .................... 713/176 |

\* cited by examiner

*Primary Examiner* — Thu Ha Nguyen
(74) *Attorney, Agent, or Firm* — Garlick & Markison

(57) ABSTRACT

A technique to ensure watermarking a highest selected layer for decoding when receiving a scalable coded bitstream having a plurality of bitstream layers. In one technique, the watermark is associated only with the highest layer that is selected from the hierarchically arranged layers and not in any of the lower layers of the hierarchy. In another technique, the watermarks are present in all the layers, but each lower layer watermark is compensated in a next higher layer to remove effects of the presence of the lower layer watermark in the next higher layer.

20 Claims, 10 Drawing Sheets

WATERMARKING FOR COMPRESSED SCALABLE CODED BITSTREAMS

BACKGROUND OF THE INVENTION

1. Technical Field of the Invention

The present invention relates generally to communication systems and, more particularly, to watermarking for scalable coded bitstreams.

2. Description of Related Art

Digital watermarking involves embedding information, known as a watermark, into digital content. Typically, the watermark is not detectable by users under normal operating conditions. Instead, the watermark is designed to be detected or extracted by specific post-processing activity, such as by use of a post-processing algorithm. Therefore, watermarking digital content allows source identification and/or tracks the distribution of the digital content. Accordingly, watermarking is a widely used tool for digital copy protection. The watermarking is applicable to both digital video and digital audio content.

Scalable coding is a type of coding that is designed for improved operation in the transfer of digital content. Scalable coding, such as scalable video coding, is adaptable to heterogeneous channel bandwidths and receiver capabilities. For example, instead of simulcasting video coding that uses separate independently coded video bitstreams to satisfy different channel and receiver capabilities, a scalable video coding scheme encodes bitstreams in a dependent manner to provide coding efficiency.

One example of a use of scalable coding is in the transmission of both low resolution and high resolution video content. A low resolution transmission may be video content destined for Standard Definition television (SDTV). A high resolution transmission may be video content destined for High Definition television (HDTV). When the type of a receiving device is known, the content provider may transmit the appropriate content, SDTV or HDTV video. However, for many applications, the content provider does not know the type of the receiving device, or the content provider provides content to a plurality of receiving devices, which may be of one type or the other, or both. Thus, both content types are transmitted.

When simulcast coding is used, the provider transmits both resolutions as two independent bitstreams. Thus, with the above SDTV/HDTV example, both SDTV and HDTV content are sent independently, and typically simultaneously. However, when scalable coding is used, the provider would transmit the two resolutions in a scalable technique. In scalable coded content transmission, the lower resolution content (SDTV) is still sent as an independent bitstream and decoded for SDTV viewing. However, the higher resolution content (HDTV) is not sent in full. Instead, a dependent bitstream is sent that includes enhancing content that builds on the SDTV content. The SDTV bitstream then operates as a base layer and the HDTV bitstream operates as an enhancement layer. In order to recover the full HDTV content, both the base SDTV layer and the enhancement layer are decoded. This concept may be further extended to additional higher resolution content with more layers. For example, for higher resolution than HDTV, a second dependent bitstream may be transmitted and combined with the other two bitstreams to recover this higher resolution digital content. The dependent bitstreams build on the content of the lower bitstream layer(s), so that typically only the higher enhancing data is sent in the dependent bitstreams, instead of all the content for a given enhancing feature. A significant advantage may be derived in bandwidth utilization with scalable coded content transmission.

A number of known standards specify or utilize scalable coding. For example, scalable video coding algorithms are associated with scalable profiles in MPEG-2 (Moving Picture Experts Group) and MPEG-4 video standards. More recently, a scalable extension to the H.264/MPEG-4 AVC (Advanced Video Coding) standard has defined a particular scalable video coding noted as SVC. Scalable video coding, whether generic scalable video coding or the specifically defined SVC under H.264/MPEG-4 AVC standard, have the ability to provide higher compression efficiency and lower complexity compared to independently transmitted bitstreams. The use of scalable coded bitstreams is not limited to video data. Scalable coded techniques may be used for audio data, or other data in general. Additionally, for many applications, but especially for video applications, the content is typically transmitted and/or stored in a compressed format to reduce bandwidth and/or storage requirements.

Although scalable coding allows for advantages in transmission, one problem that may develop is with the use of watermarks. Compressed domain watermarking has traditionally been designed for non-scalable coding schemes, such as the above described simulcasting of independent bitstreams. Since each bitstream is a single layer and independent from other bitstreams, each bitstream may be watermarked separately. Although some processing of inter-frame dependencies may be required to avoid visual artifacts caused by drift (e.g. difference between encoder/decoder prediction states) when watermarks are present, the effects of having a watermark present is minimal.

However, with scalable coded bitstreams, decoding of an enhancement layer depends not only on previously decoded picture states, but also on corresponding lower layers of the same picture. Modification of a lower layer bitstream in compressed domain may affect decoding of not only the future pictures in that layer, but also other layers as well. With scalable coding, the watermark should reside in the highest decoded layer. If the highest decoded layer and the watermarked layer are different, the watermark is circumvented. If the watermark resides in multiple layers, significant degradation and/or corruption of the signal may result. Further complicating the use of watermarks in scalable coded bitstream is that a decoder may select to decode more than one format. Additionally, the layer(s) selected for decoding at the receiver is generally not known at the transmitter. These characteristics, as well as others, make compressed domain watermarking for scalable coded bitstreams much more complicated than for non-scalable bitstreams.

Thus, for scalable coded bitstreams, there is a need to develop a technique to provide a watermark for the appropriately decoded layer without having the watermark circumvented.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that utilize a receiving device that receives scalable coded data. The term "scalable coded bitstream" is used herein for explanatory purpose only. The scalable coded data need not necessarily be in a bitstream format. Other data transfer may be applicable as well. The information conveyed in the scalable coded bitstream may be video, audio, a combination of video and audio (e.g. multimedia), or of some other type. Furthermore, the scalable coded bitstream being conveyed may be of arbitrary format, proprietary format or a format that is defined by one of the standards, such as the afore-mentioned MPEG-2, MPEG-4, SVC defined by H.264/MPEG-4 AVC, or some other standard. Furthermore, although the Figures identify various processing functions within a receiver, some or all of these processing functions may be performed by a distributed node, such as a network node or an access node.

Figure 1:
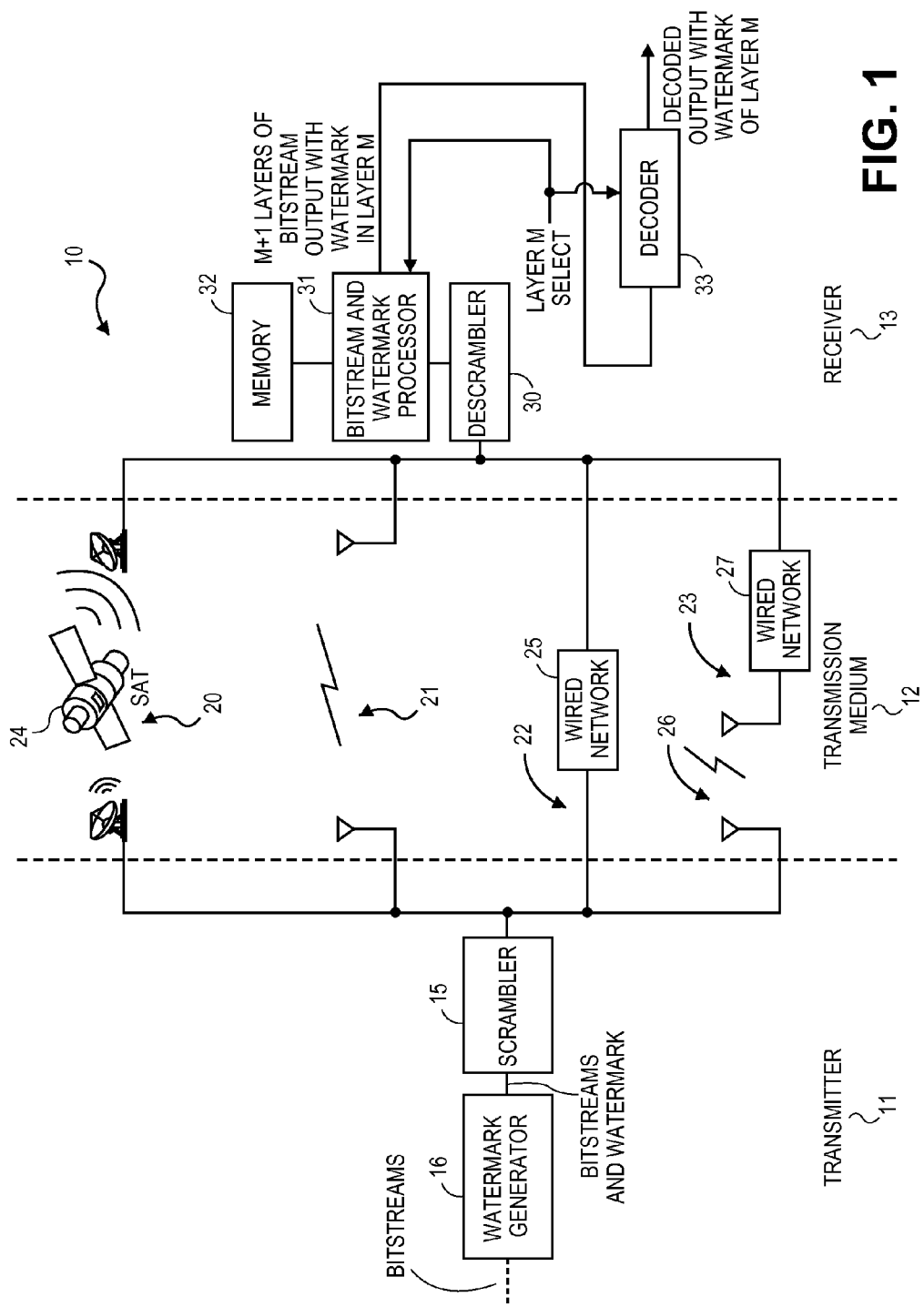
FIG. 1 is a system diagram showing one example system in which the invention is implemented.

FIG. 1 shows a system 10 that includes a transmitter 11, receiver 13 and a transmission medium 12. Transmitter 11 is used to transmit a scalable coded bitstream, in which the scalable coded bitstream is hierarchically arranged in a plurality of bitstream layers. The various layers may be sent serially, in parallel or a combination of both. The bitstream layers may be sent in one channel or in a plurality of channels. As noted above, the scalable coded bitstream may comprise video, audio, both video and audio, or some other type of data. The scalable coded bitstream may be of arbitrary format, proprietary format or a format that is defined by one of the standards, such as the afore-mentioned MPEG-2, MPEG-4, or SVC defined by H.264/MPEG-4 AVC. It may be of some other standard as well.

The various bitstream layers (bitstreams) are hierarchically arranged, so that a base layer (referenced herein as a base layer or layer 0) provides a lowest layer of the scalable coded bitstream. Thus, bitstream layer 0 is sent in full and data contained in bitstream layer 0 is capable of being decoded alone, without any other layer, for end use at receiver 13. Bitstream layer 1 is an enhancement layer that enhances (e.g. builds upon) layer 0. When information contained in layer 1 is to be used at receiver 13, both layer 0 and layer 1 are selected and decoded. That is, information contained in both layer 0 and layer 1 are decoded in order to apply the enhanced feature provided by layer 1. Similarly, bitstream layer 2 then builds upon both layer 0 and layer 1 to provide additional enhancement over that provided by layer 1. In this instance, all three layers (base layer 0, enhancement layer 1 and enhancement layer 2) are decoded. Subsequent enhancement layers operate equivalently to provide additional enhancements to corresponding lower layer or layers. Accordingly, only layer 0 operates alone to provide information at end use and all other layers use one or more lower layers to provide information at end use. As used herein, when stating that a particular layer M is to be decoded, this also implies that layer M as well as lower bitstream layer(s) that layer M relies upon are decoded together, wherein layer M is the highest layer selected for the decoding operation.

The enhancement layers (layer 1 to N, where n is an arbitrary number) provide enhancements that may be characterized in one or more ways. Some common enhancement profiles are noted as spatial, temporal and quality. As an example, spatial profile may pertain to resolution. As such, as an example, layer 0 bitstream may contain data for presentation on a standard definition television (SDTV). Layer 1 bitstream may contain additional enhancing data that when combined with layer 0 data, provides data for presentation on a high definition television (HDTV).

In an temporal example, layer 0 bitstream may contain data to present a video at 15 frames per second. Layer 1 data may contain enhancement data so that when combined with layer 0 data, the combination allows for video presentation at 30 frames per second. Subsequently, layer 2 data may contain enhancement data so that when combined with layer 0 and layer 1 data, the three layers provide video presentation at 60 frames per second.

Still in another example to show a quality profile, layer 0 bitstream data may be used to provide certain colors in the video presentation. Each enhancement layer may use successive additional bits to add scalability to improve the color quality. These are just some examples and other scalable enhancement techniques may be used when transmitting content from transmitter 11.

The bitstreams are sent to a watermark generator 16, wherein a watermark is generated corresponding to each of the bitstream layers. As will be described below, two example techniques A and B may be used to add a watermark, such that a particular selected bitstream layer being decoded at the receiver contains an appropriate watermark. If it is known that one or more layers will not be decoded as the highest layer in the decoding operation at the receiver, then a watermark for that layer(s) is/are not needed. However, the examples described herein assume that all layers may be decoded as the highest selected layer in the decoding operation. The watermark for the layers may be same, different or a combination thereof. The actual watermark being generated is not critical for the understanding of the invention, suffice that some form of watermarking is provided so that a watermark is generated and associated with each bitstream layer being transmitted. Thus, bitstreams with corresponding watermarks are output from watermark generator 16.

The watermarking is generally used to identify the source, ownership or some attribute that is to be attached to the content being transmitted. For the one described technique (Technique A) for transmitting the watermarks, the watermarks are not embedded in the bitstreams, but may be sent together with the respective bitstream layers or, alternatively, the watermarks may be sent separately (such as through a separate channel) from the bitstreams. In the second described technique (Technique B), the watermarks are embedded in respective bitstream layers and, thus, are transmitted within the bitstreams. Whether using technique A or technique B, the bitstreams and the associated watermarks are then transmitted through transmission medium 12 to receiver 13. In some instances, a scrambler 15 may be used to scramble the signal before transmission.

The hierarchically arranged N bitstream layers are transmitted to receiver 13 through transmission medium 12. Several examples of medium 12 are shown in FIG. 1, but the medium is not limited to these shown. The bitstreams and the watermarks may be sent via a satellite communication link 20 using satellite 24; a wireless communication link 21; a wired communication link 22, such as a wired network 25 or a landline phone system; or through a communication path 23 that uses a combination of links, shown by wireless link 26 and wired link 23 of wired network 27. Other combinations are possible. Additionally, the various layers and/or the watermarks may be sent through more than one channel or link.

Receiver 13 is comprised of a bitstream and watermark processor 31, memory 32 and decoder 33. A descrambler 30 may be included in some embodiments, in the event scrambler 15 was used to scramble the bitstreams. Other embodiments may not have the descrambler. Furthermore, some embodiments may have a device for deciphering or decrypting. Receiver 13 receives the bitstream layers and the corresponding watermarks through one or more communication links of medium 12. Descrambler 30, if present, then provides descrambling of the received signal. The scalable coded bitstream and the corresponding watermarks (whether included within the bitstream layers or reside separately from the bitstream layers) are coupled to processor 31 to be operated upon. In some embodiments memory 32 may be present to buffer or store the data. Memory 32, or even another memory, may also be used to store instructions for executing by processor 31.

Processor 31 operates upon the received bitstream layers and the watermarks. The operation of processor 31 depends on the watermarking technique that is applied at transmitter 11. As will be described below, when technique A is used, processor 31 receives the bitstreams layers without having the watermark embedded in each of the bitstream layers. In this instance, the watermarks are transmitted as separate carrier data from transmitter 11. Upon receiving a LAYER_M_SELECT signal that indicates which bitstream layer is to be selected as the highest bitstream layer for the decoding operation, processor 31 embeds a corresponding watermark for that layer M and then generates an output that includes the bitstream layers that are used for decoding. With technique A, the watermark is resident only in layer M.

As will also be described below, when technique B is used, receiver 13 receives the bitstream layers with the watermarks already embedded in the bitstreams. In this instance, processor 31 receives the LAYER_M_SELECT signal that indicates which bitstream layer is to be selected as the highest layer used in the decoding and outputs those layers for decoding. With technique B, the watermarks are present in the bitstream layers being output from processor 31. However, as described below, adjustments are made in each of the higher layers to account for the presence of watermarks in the lower bitstream layers being decoded.

Thus, whether technique A or technique B is used, processor 31 outputs only those bitstreams layers that are to be decoded (M+1 layers) and ensures that a corresponding watermark is present in the highest layer (layer M) being decoded. Subsequently, decoder 33 decodes only those bitstream layers that are output from processor 31 along with the watermark that is present in layer M. The LAYER_M_SELECT signal is also coupled to decoder 33 to inform the decoder which bitstream layer is layer M, so that appropriate decoding circuitry, routines, etc. may be applied to the output of processor 31. Accordingly, the decoded output contains an appropriate watermark associated with the highest layer that was decoded.

Technique A

Figure 2:
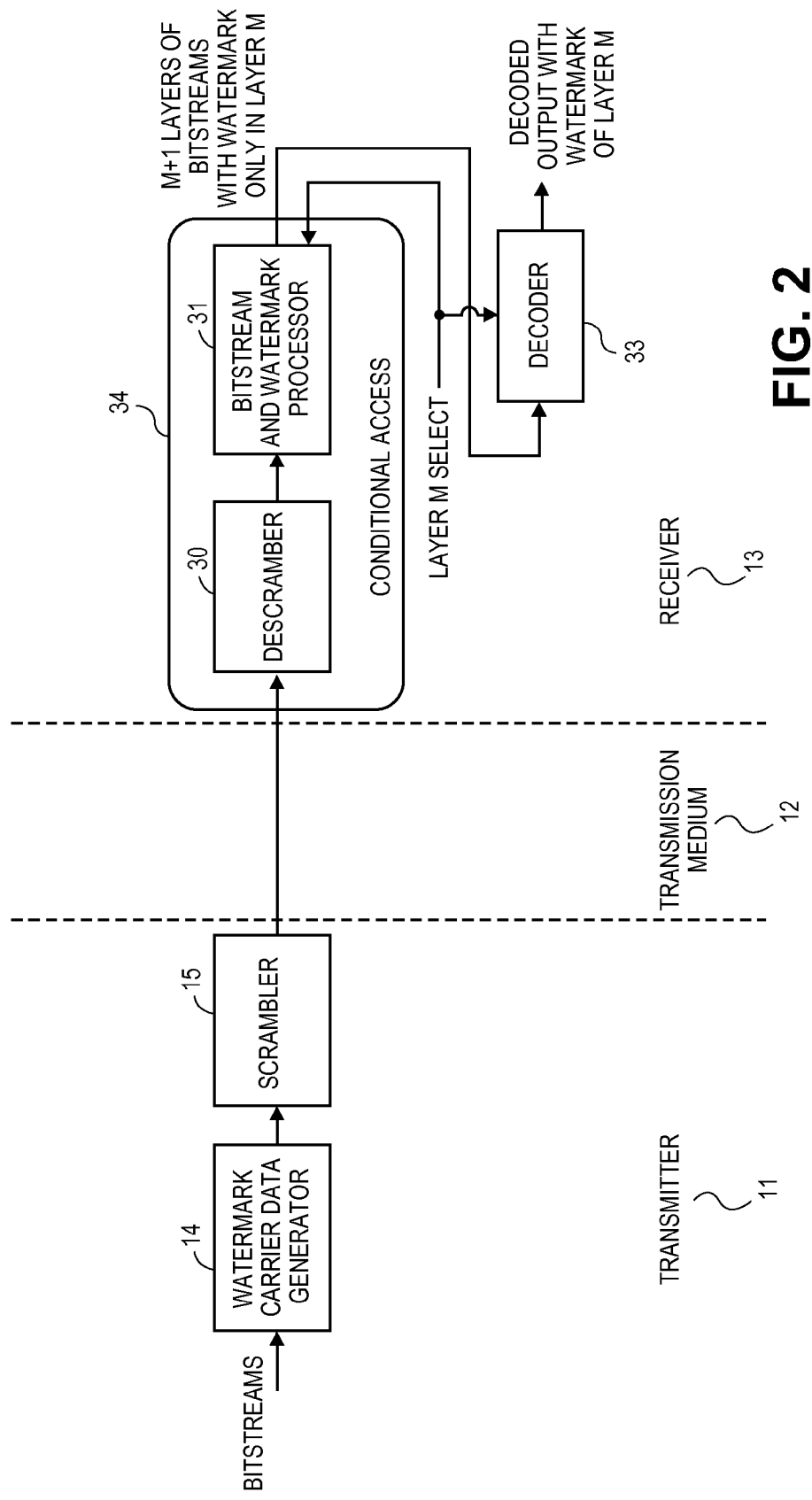
FIG. 2 is a functional block diagram showing one embodiment of the invention for practicing a first technique (technique A) in watermarking a scalable coded bitstream.

FIG. 2 shows a block diagram of an embodiment of the invention for practicing technique A noted above. In technique A, transmitter 11 transmits the bitstream layers and the respective watermarks for each of the bitstream layers as separate data. The watermarks may be transmitted alongside the bitstream layers or separately from the bitstream layers, but the watermarks are not inserted (e.g. embedded) in the respective bitstream layers. In one embodiment, the watermarks are transmitted as carrier data accompanying the bitstream layers. Accordingly, in the embodiment of FIG. 2, a watermark carrier data generator 14 is used for watermark generator 16 of FIG. 1 to generate the watermark carrier data for transmission from transmitter 14. Scrambler 15 is also shown in FIG. 2, but as was noted above in reference to FIG. 1, scrambler 15 may not be present in other embodiments.

Figure 3:
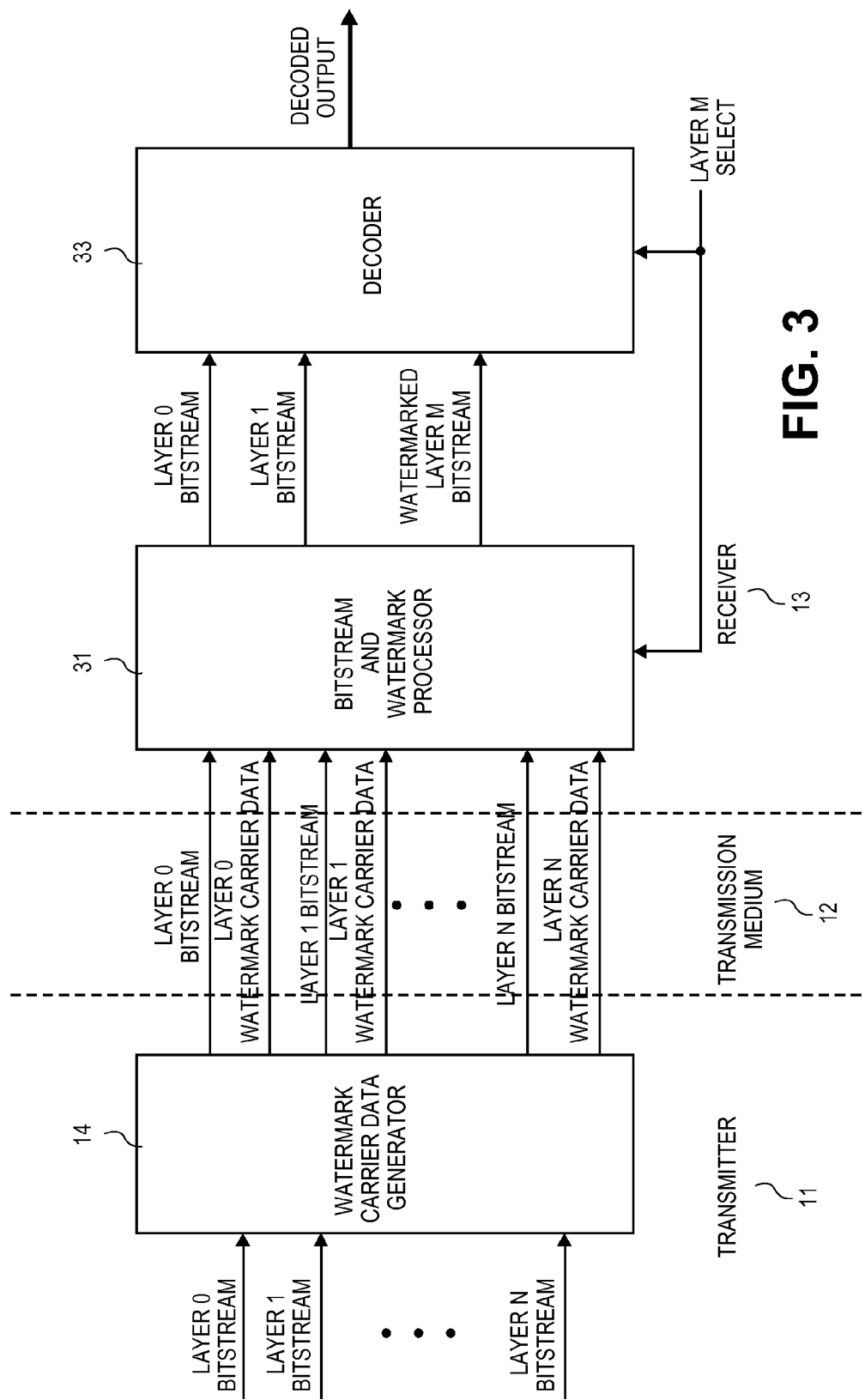
FIG. 3 is a functional block diagram showing one embodiment of the invention for receiving transmitted scalable coded bitstreams along with corresponding watermark carrier data and processing to obtain a desired number of bitstream layers with watermarking present only in a highest layer selected for decoding to practice technique A of the invention.

Also referring to FIG. 3, it shows a more detailed diagram for the generation and transmission of the watermarks from transmitter 11. In FIG. 3, scrambler 15 and descrambler 30 are not shown, in order to simplify the explanation. However, it is to be noted that scrambler 15 and descrambler 30, as well as other devices (such as ciphering and de-ciphering devices), may be utilized.

As shown in FIG. 3, bitstream layers 0-N are coupled to watermark carrier data generator 14, where corresponding watermark carrier data are generated for each of the bitstream layers 0-N. In the example, it is presumed that any of the layers 0-N may be selected as the highest bitstream layer for decoding, so that watermark carrier data is generated for each of the bitstream layers. However, if it is known that a particular layer(s) will not be selected as the highest layer for decoding, then a watermark for that non-selectable layer may be skipped. It is to be noted that some layers may use the same watermark, but in order to maintain a 1-to-1 relationship, a watermark is associate with each bitstream layer in the described examples. Accordingly, watermark carrier data generator 14 outputs bitstream layers 0-N, along with watermark carrier data for layers 0-N, as shown in FIG. 3, for transmission from transmitter 11.

Processor 31 operates upon the received scalable coded bitstream and, based on the select signal LAYER_M_SELECT, selects one particular bitstream layer M from the plurality of N bitstream layers. The selected layer M is the highest layer that is to be decoded for a given end use. The LAYER_M_SELECT signal may be automatically generated based on some selection criteria or it may be in response to a manual input, such as in response to a user input selection. Once layer M for decoding is selected, processor 31 extracts the bitstream of layer M and a set of hierarchically lower bitstream layer(s) as output from processor 31. Stated differently, M is the highest layer extracted from a plurality of bitstream layers between 0 and N. If the selected layer M is the base layer (layer 0), then just that base layer is output from processor 31. The layer M selected by the LAYER_M_SELECT signal also extracts the watermark carrier data for that layer. As will be noted in the description of the subsequent Figures, the watermark carrier data for layer M is associated with the selected decoded layer M and the extracted watermark for layer M is embedded in the bitstream for layer M. Processor 31 ensures that the watermark(s) for the lower layers are not embedded into the bitstreams of the lower layers, so that the watermark information is only present in the highest bitstream layer that is selected for decoding.

As shown in FIG. 3, processor 31 outputs bitstream layers 0-M with only layer M watermarked. The hierarchically lower layers do not contain a watermark. The output from processor 31 to decoder 33 comprises the highest bitstream layer selected (layer M) accompanied by its corresponding watermark and bitstreams of the set of lower layers, but without the respective watermarks for the lower layers. Because for many applications, a particular enhancement layer is based on the combination of that bitstream layer combined with all of the lower bitstream layer(s) for decoding purposes, the set of lower bitstream layers output from processor 31 includes all lower bitstream layers of the hierarchical arrangement. However, in some embodiments, it is possible that not all lower layers are need for the enhancement to be provided by decoding layer M. In that instance, only those lower layers needed for the selected enhancement is output from processor 31, but with the watermark associated only with layer M.

Decoder 33 receives the bitstream layers (or just the base layer, if M is 0) and the watermark associated with layer M. Although, the term embedded is used herein, any of a variety of techniques may be employed to associate or insert watermark for layer M into the layer M bitstream. Decoder 33 then decodes the output of processor 31 and generates a decoded output to an end unit, which typically is a receiving device that processes, stores or presents the decoded output.

The end unit may be of a variety of devices. For example, for decoded video bitstreams, the output may be to a television unit, a computer monitor, or to some other display for viewing the video. For audio bitstreams, the end unit may be a headphone, speaker, portable audio player (such as a MP3 player) or some other listening device. In other instances, the end unit may be a storage unit, such as a DVD disk, computer memory, hard disk, etc., for storing the decoded output. The type of end unit is not critical to the practice of the invention, other than the application of the decoded output from decoder 33. As noted, the LAYER_M_SELECT signal is also coupled to decoder 33 in order for decoder 33 to know which decoding circuitry, algorithm, routine, or other hardware and/or software are to be used to decode layer M.

Furthermore, it is to be noted that receiver 13 may be designed within a variety of devices. For example, receiver 13 may be a set top box (STB) for processing multimedia signals to a video display, such as a television set. In one embodiment, a base layer video bitstream may provide video data for display on a SDTV unit and an enhanced layer selection would provide video data for display on a HDTV unit. For base layer audio, the audio signal may be monaural and enhanced layer audio may provide for stereophonic sound. A yet higher enhanced layer audio may provide surround sound. The applications are numerous for using scalable coded signals, as well as the devices that incorporate the receiver. However, in these instances, placing a watermark associated with the highest bitstream layer selected ensures that proper watermarking is present in the final decoded output and ensures that the watermarking is not corrupted or circumvented. Furthermore, because the watermark is associated with the decoded layer only, effects (such as artifacts) from having the watermark present in the other layer(s) are not present or at least made negligible.

Additionally, although various components are shown in receiver 13 and these components may be housed in one unit, in other embodiments, the receiver may be housed in multiple units or even distributed on a network or in remote nodes. For example, if the content is being transmitted from a cable provider, processor 31 may be located within a cable modem and decoder 33 may be located within a display, such as a television set, or even in a computer. Various other combinations abound.

In practicing technique A, processor 31 and descrambler 30, when present, operate as a conditional access module 34 (shown in FIG. 2) to provide a conditional access at receiver 13. Because the watermarking process is split into two stages (generation of the watermarks at the transmitter and insertion of a respective watermark into selected layer M at the receiver) when practicing technique A of the invention, certain requirements are to be satisfied by the conditional access to guarantee a proper procedure for a watermarked, decoded output. Namely, a watermark carrier data is generated for each bitstream layer that may be decoded at the receiver. The same reference used for layer selection (noted herein as reference M) is used for extracting the bitstream(s), embedding the watermark and directing the decoder for decoding. Conditional access module 34 is to ensure that decoder 33 is not to output decoded signals that are different from layer M decode.

The conditional access when combined with the watermarking ensures that only the highest bitstream layer selected for decoding has the proper watermarking to generate the output from decoder 33. Otherwise a watermark may be easily discarded or the watermark carrier data may be tampered with. By tying the bitstream layer extraction, embedding of the watermark and decoding of the various bitstream layers at the decoder to a single conditional access requirement, such as the use of the LAYER_M_SELECT signal in the described example, an appropriate watermark is ensured to be present in the highest layer selected for decoding.

Figure 4:
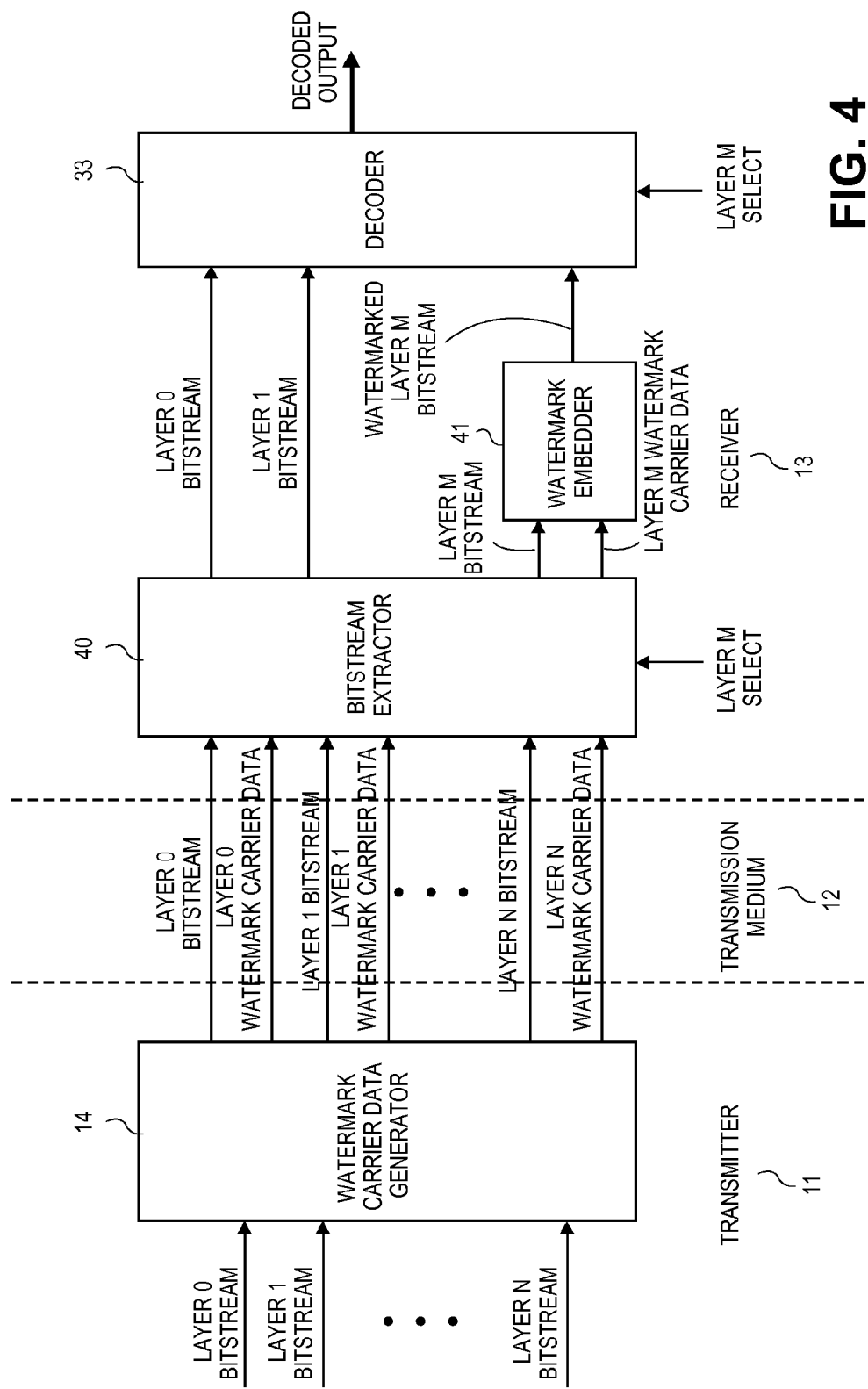
FIG. 4 is a functional block diagram showing one embodiment of the invention for receiving transmitted scalable coded bitstreams along with corresponding watermark carrier data, extracting the desired number of hierarchically arranged bitstream layers, and embedding a watermark in a highest extracted bitstream layer for decoding to practice technique A of the invention.

FIG. 4 illustrates one detailed embodiment for practicing technique A described above to target a watermark to the highest of the decoded layer. The embodiment of FIG. 4 is utilized to embed a watermark in an extracted bitstream layer M. In FIG. 4, transmitter 11 transmits the content in scalable coded bitstream format as described above, similar to the example of FIG. 3. After transitioning through watermark carrier data generator 14, the bitstream layers and respective watermark carrier data are transmitted via transmission medium 12 to receiver 13. The N bitstreams and the corresponding watermark carrier data are coupled to a bitstream extractor 40. Bitstream extractor 40 receives the LAYER_M_SELECT signal, so it now knows which layer is to be decoded. Bitstream extractor 40 then extracts bitstream layers 0 to M and extracts the watermark carrier data for selected layer M. It is to be noted that if only the base layer is to be decoded, then only layer 0 is extracted with the layer 0 watermark carrier data. Furthermore, if M=N, then no bitstream layer extraction is necessary, since all layers would be used in the decoding. Only layer N watermark carrier data would be extracted.

Once the bitstream layer(s) and the selected layer M watermark carrier data are extracted, the layer M bitstream and the layer M watermark carrier data are coupled to a watermark embedder 41. Watermark embedder 41 uses the layer M watermark carrier data to embed the layer M watermark in the layer M bitstream. Typically, watermark carrier data includes a list of auxiliary watermarking information to assist in placing the watermark. Auxiliary watermarking information may include, but are not limited to, such items as 1) a layer ID that specifically denotes the layer that the watermarking auxiliary information applies to; 2) corresponding bit/byte locations of the bitstream which should be replaced with the watermark; and 3) the replacement watermark data for the bit/byte locations specified.

The output of watermark embedder 41 is a watermarked layer M bitstream. The watermarked layer M bitstream is coupled to decoder 33. The set of lower level bitstreams are coupled from bitstream extractor 40 to decoder 33 without embedded watermarks. Decoder 33 then decodes the bitstreams it receives to generate a decoded output. The LAYER_M_SELECT signal is also coupled to decoder 33 so that decoder 33 knows which circuitry, algorithm, etc., to use in decoding the bitstreams.

It is to be noted that with technique A, only the highest decoding layer is actually modified to include the watermark. Lower bitstream layer(s) used in decoding is/are kept intact and hence there is no drift caused by the inter-layer dependency of scalable bitstreams. It is to be noted that bitstream extractor 40 and watermark embedder 41 may be included within processor 31 of FIGS. 1, 2 and 3 in one embodiment of the invention. In other embodiments, extractor 40, embedder 41, and even decoder 33, may be provided in a single processing device or module, such as a digital signal processor (DSP).

Figure 5:
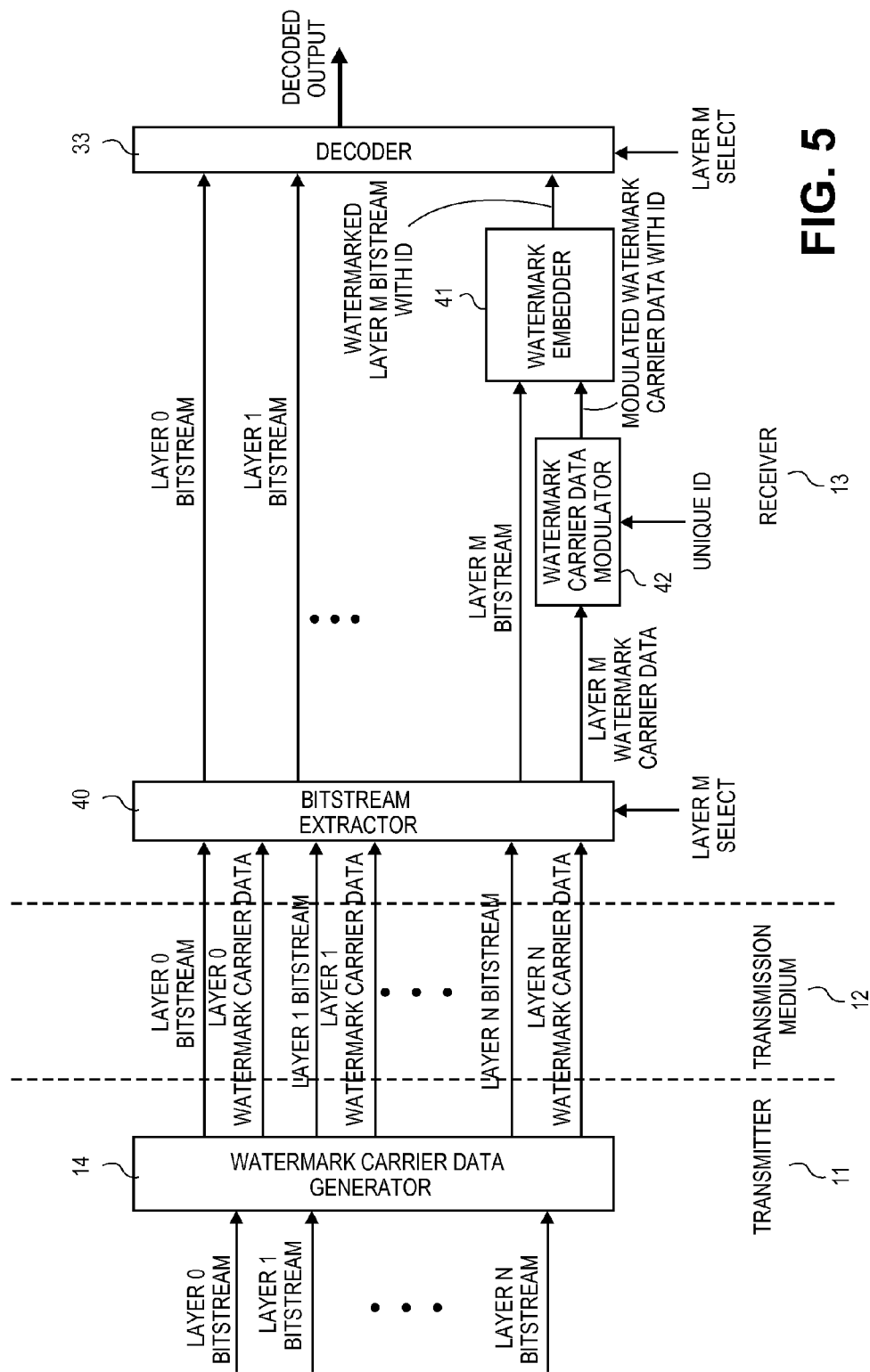
FIG. 5 is a functional block diagram showing one embodiment for using a watermark carrier data modulator downstream from an extractor of FIG. 4 to insert a unique ID in the watermark carrier data for a selected highest later to be decoded.

In some instances, it is desirable to further watermark the content to include information as to which receiving or decoding device received the content. This additional watermarking identifies the recipient, so that any further copying or distribution of the content by the recipient may be tracked. In order to provide recipient tracking, a unique identification (unique ID) is inserted in the watermark. Accordingly, in order to achieve the insertion of the unique ID, FIG. 5 shows a watermark carrier data modulator 42 that receives the unique ID information and inserts the unique ID in the selected layer M watermark carrier data, before the layer M watermark carrier data is sent to watermark embedder 41. Then, the unique ID is embedded as part of the watermark of layer M.

Figure 6:
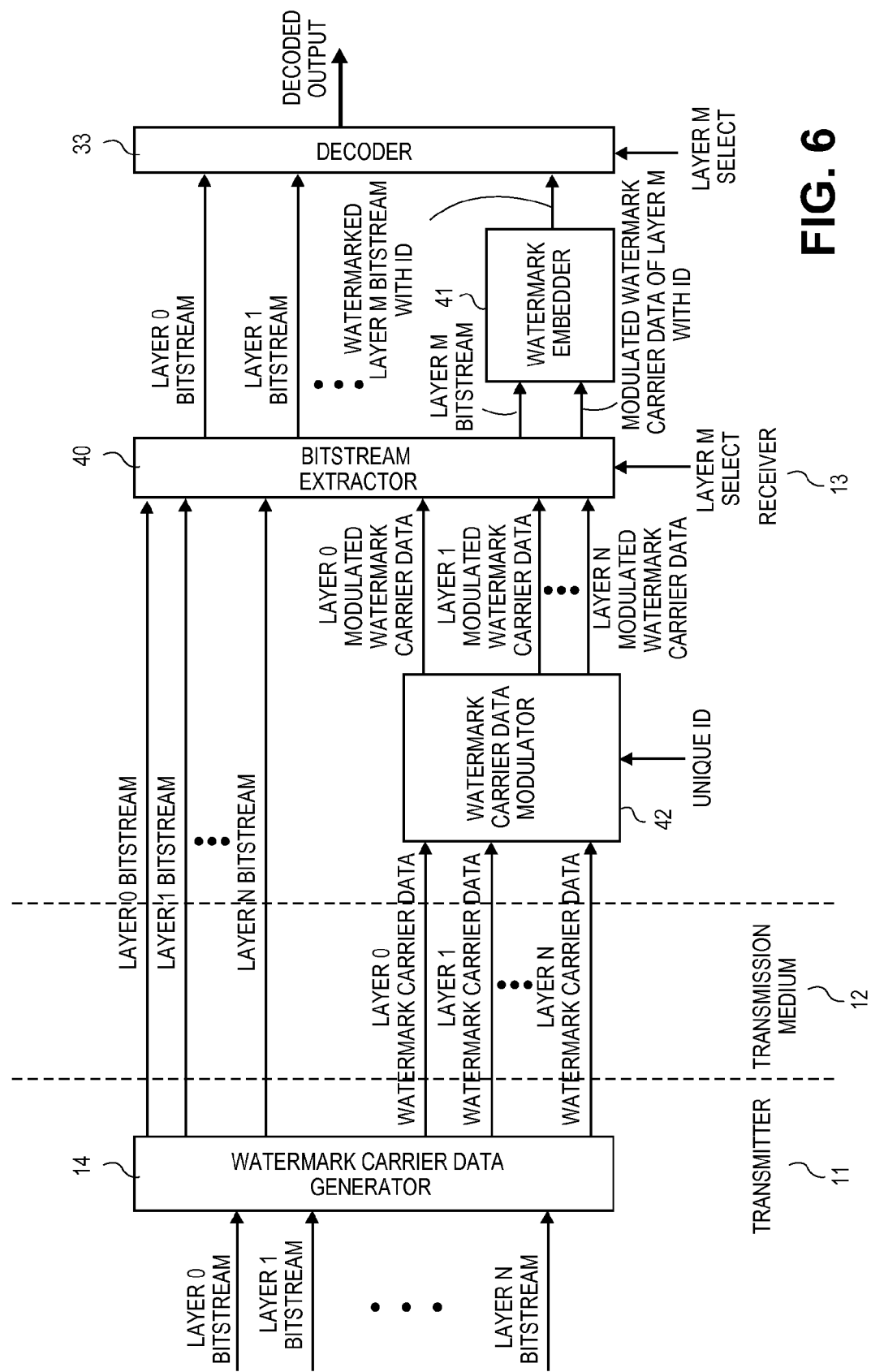
FIG. 6 is a functional block diagram showing one embodiment for using a watermark carrier data modulator upstream from an extractor of FIG. 4 to insert a unique ID in all the watermark carrier data prior to extracting a selected highest layer for decoding.

In FIG. 5, watermark carrier data modulator 42 reside downstream from bitstream extractor 40 and the unique ID watermark is inserted only in the watermark carrier data of layer M. In FIG. 6, watermark carrier data modulator 42 reside upstream from bitstream extractor 40 and the unique ID is inserted in all of the watermark carrier data before the watermark carrier data are coupled to bitstream extractor 40. However, since only the layer M watermark carrier data is extracted by bitstream extractor 40, the end result of embedding the unique ID as a watermark in the layer M bitstream is the same.

Technique B

Figure 7:
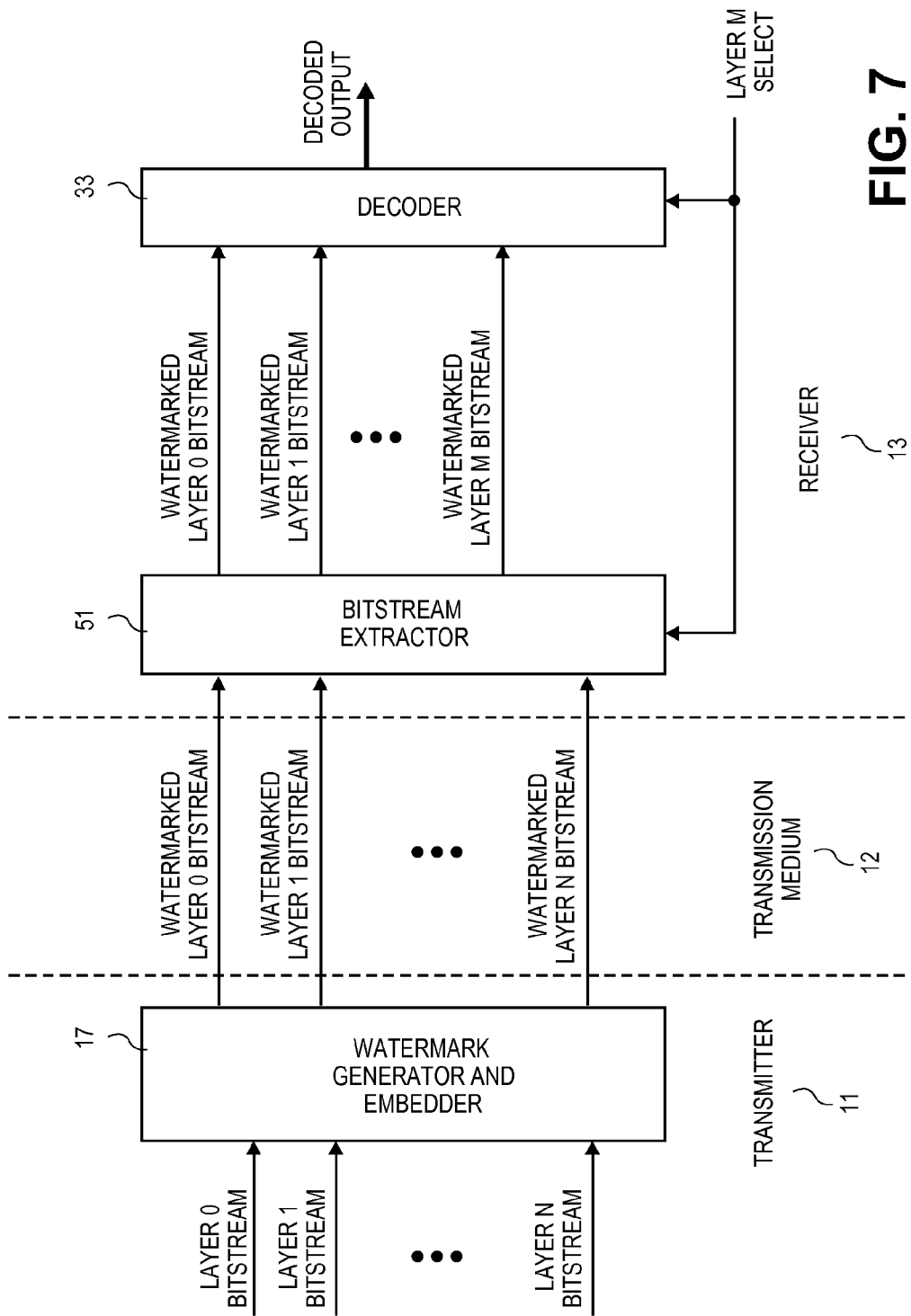
FIG. 7 is a functional block diagram showing one embodiment of the invention for practicing a second technique (technique B) for receiving transmitted scalable coded bitstreams that already have embedded watermarks which are hierarchically compensated in each higher layer, extracting the desired number of hierarchically arranged bitstream layers with the watermarks and decoding the compensated extracted bitstream layers.

FIG. 7 shows an alternative technique (noted as technique B) of decoding scalable coded bitstream that has an embedded watermark in the highest bitstream layer selected for decoding. Instead of watermarking only the highest layer selected for decoding, technique b embeds respective watermarks in all of the layers that may be selected for decoding at the receiver. Thus, as shown in FIG. 7, a watermark generator and embedder 17 is utilized at transmitter 11 to generate and hierarchically embed corresponding watermarks in each of the layers 0-N. As noted above, if a particular bitstream layer is not to be selected as the highest layer for decoding at the receiver, then that layer need not be watermarked. However, the embodiment described herein presumes that any one of the layers 0-N may be selected as the highest decoded layer at the receiver, so that each of the bitstream layers 0-N is watermarked. In some embodiments, watermark generator and embedder 17 may be incorporated in watermark generator 16 of FIG. 1 and used within system 10.

With technique B, watermark generator and embedder 17 inserts (or embeds) the watermarks hierarchically starting from the lowest layer and compensates for the presence of the watermark in the lower layer when the next higher layer is watermarked. For example, layer 0 bitstream is watermarked first. When watermarking the layer 1 bitstream, layer 1 is compensated for the presence of the watermark in layer 0. This compensation may be performed separately or together with the placement of the layer 1 watermarking. Thus, when bitstream layer 1 is decoded at the receiver, the presence of the watermark in bitstream layer 0 is compensated when bitstream layer 1 is decoded.

Subsequently, when layer 2 bitstream is watermarked, layer 2 is compensated for the presence of the watermark in layer 1. This hierarchical scheme is used as each subsequent higher layer watermarking is added. Since each layer is compensated for the presence of a watermark in the next lower layer, effects, such as drifting caused by a lower layer watermark, are cancelled or made substantially negligible. It is to be noted that for scalable coded bitstreams, a given layer is typically predicted from a lower layer, so any changes (such as the embedding of a watermark) influences and corrupts the inter-layer prediction for the higher layer. In order to compensate for the presence of the lower level watermark, the watermark applied to the next higher layer is inserted so that it first breaks the inter-layer prediction from the next lower layer. This results in the lower layer watermark having minimal effect in corrupting the higher layer when the higher layer is decoded. At the same time, the presence of the watermark in the higher layer ensures that a watermark is present if this higher layer is later selected as the highest layer for decoding.

Figure 8:
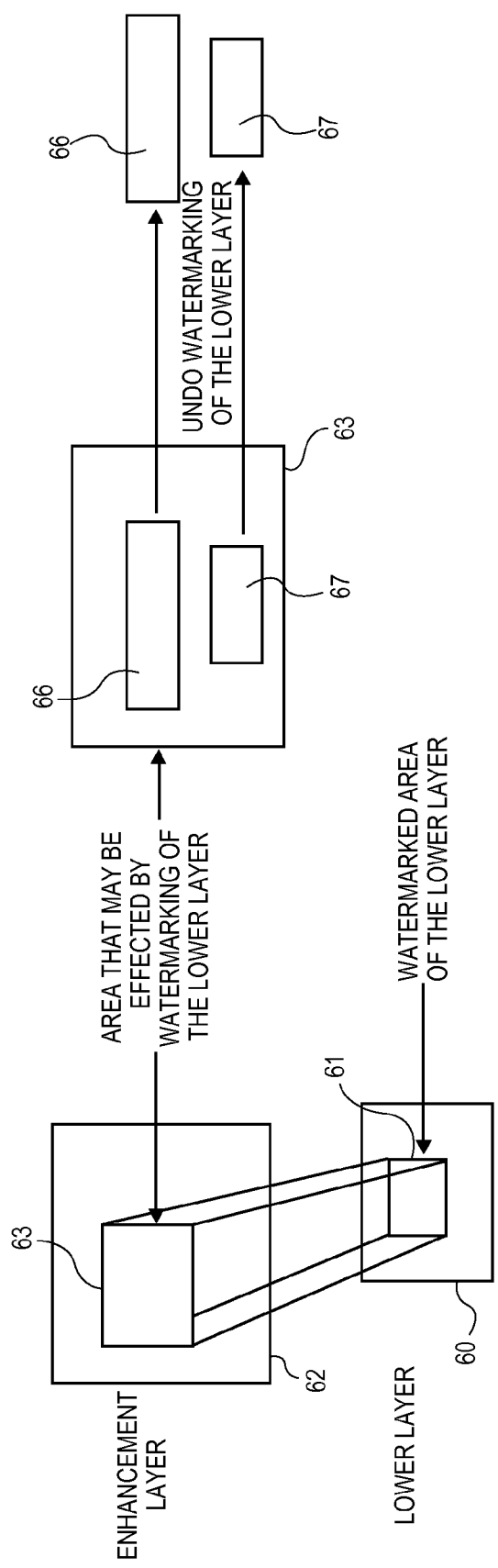
FIG. 8 is pictorial diagram illustrating one example for compensating in a higher layer for a watermark that is present in a next lower layer of a hierarchically arranged scalable coded bitstream.

An illustration of a hierarchical compensation of watermarks is illustrated in FIG. 8. In FIG. 8, an enhancement layer 62 and a next lower layer 60 is shown. Enhancement layer 62 is the higher layer of the two layers shown and has a portion 63 which is affected by the watermarking of lower layer 60. The watermarked portion of layer 60 is shown as area 61. That is, watermarked area 61 of lower layer 60 causes corruption in portion 63 of enhancement layer 62, if the watermarked layer 61 is not compensated in layer 63. In order to reduce this artifact which may corrupt enhancement layer 62, the affected region 63 is compensated (or adjusted) for the presence of watermark area 61. The compensation is performed in enhancement layer 62. In one embodiment, bitstream portion associated with portion 63 is re-encoded.

Furthermore, in one embodiment, watermark generator and embedder 17 locates portion 63 and then checks macro blocks 66, 67 related to the inside of portion 63. Depending on the prediction mode utilized, watermark generator and embedder 17 determine the effect caused by the watermark of area 61 in portion 63 and then re-encodes these macro blocks 66, 67 in enhancement layer 63 to compensate for the drift caused by the lower layer watermarking. The re-encoding process used may depend on the specific coding modes available in enhancement layer 62. As noted above, inter-layer prediction may be used in some instances to provide the re-encoding. When there are more than two layers, this approach is used in a hierarchical fashion through successive higher layers to re-encode the macro blocks affected by the watermarks of the successive lower layers. When the compensation operation is utilized together with the watermarking of the higher layer, the process ensures that a watermark is always present in a layer selected as the highest layer for decoding at the receiver.

It is to be noted that other compensation techniques may be used, and the invention is not limited to the compensation techniques described herein. Furthermore, a compensation technique may be implemented in which a lower lever watermark is removed in the next higher layer, so that when the higher layer is decoded, the lower level watermark is not present.

Referring again to FIG. 7, the hierarchically watermarked and compensated bitstream layers are transmitted from transmitter 11 to receiver 13 via transmission medium 12. It is to be noted that technique B transmits the watermarks already embedded in the corresponding bitstream layers. Therefore, watermark carrier data need not be transmitted along with the bitstream layers. Accordingly, when receiver 13 receives the transmission, receiver 13 needs only to extract those bitstream layers which are to be decoded. A bitstream extractor 44 operates to extract those bitstreams for decoding, in which the highest layer M extracted is determined by the LAYER_M_SELECT signal. In one embodiment, extractor 51 may be implemented within processor 31 of FIG. 1. The extracted bitstreams are decoded by decoder 33. The compensation scheme described above ensures that when a higher layer is decoded, that higher layer is already compensated for the presence of the watermark of the next lower layer. Further, since watermarks are present in each layer, the highest layer selected for decoding is ensured to have the correct watermark present at the output of decoder 33. The hierarchical compensation technique of technique B ensures that all lower level watermark effects are addressed at each subsequent higher level. Thus, with technique B, since all layers are watermarked from the start, no matter which layer is selected for decoding, the watermark is guaranteed to be present in the highest layer selected.

Hybrid Technique

Figure 9:
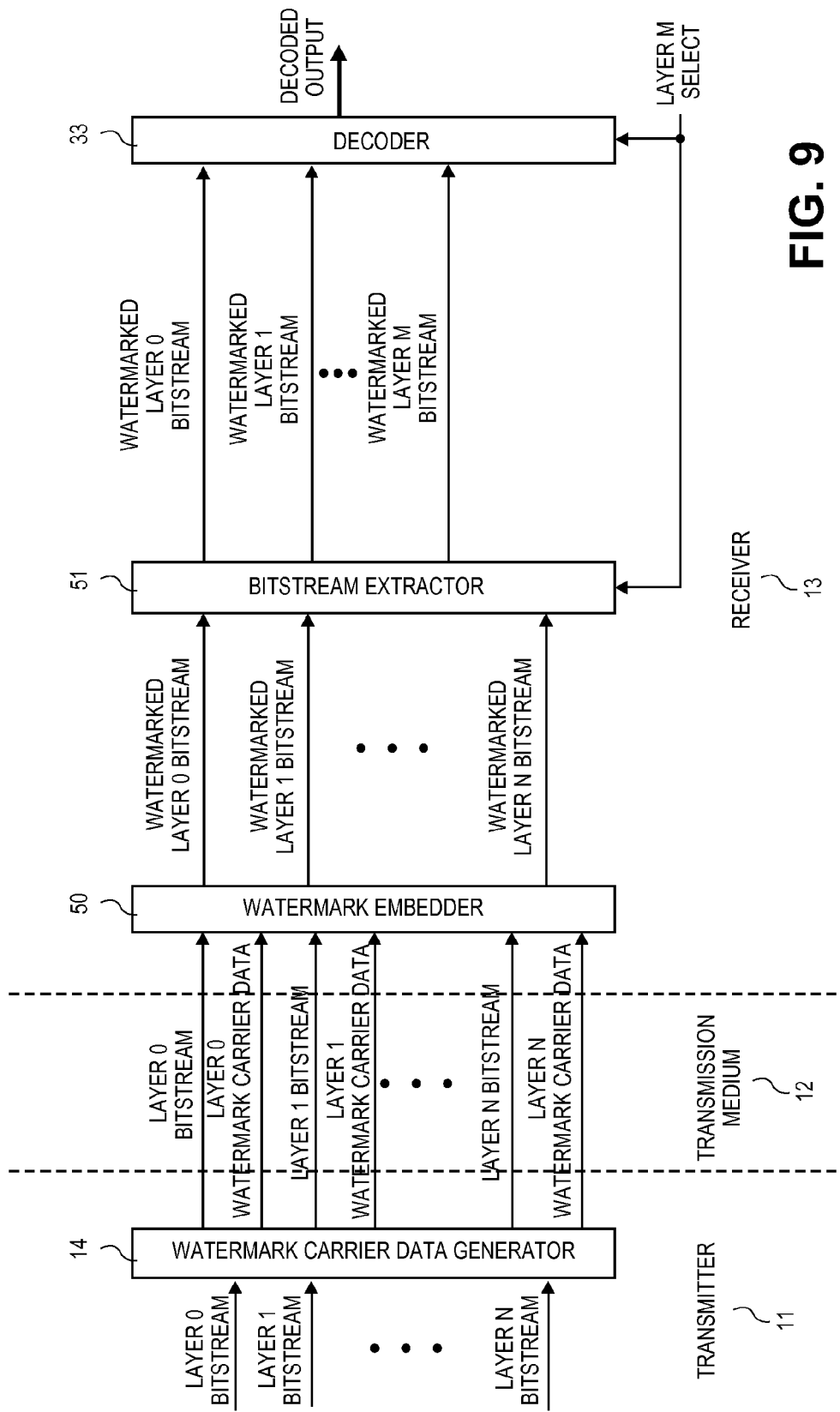
FIG. 9 is a functional block diagram showing one embodiment of the invention for practicing a technique that is a hybrid of the first (A) and second (B) techniques for receiving transmitted scalable coded bitstreams along with corresponding watermark carrier data, hierarchically embedding respective watermarks in the bitstream layers while compensating for presence of watermarks in each lower layer, extracting the desired number of hierarchically arranged bitstream layers with the watermarks and decoding the compensated extracted bitstream layers.

FIG. 9 shows a hybrid approach that combines technique A and technique B. In the hybrid approach to implementing the watermarking, bitstream layers 0-N and watermark carrier data for layers 0-N are generated from watermark carrier data generator, as described above in reference to technique A, and sent to receiver 13. At the receiver, watermark embedder 50 hierarchically embeds the watermarks to each respective bitstream, in which each higher layer compensates for the presence of a watermark in the next lower layer. That is, once the watermarks are recovered from the watermark carrier data, embedder 50 operates similar to watermark generator and embedder 17 of FIG. 7, to hierarchically place the watermarks in each layer while compensating the higher layer for the presence of the watermark in the next lower layer. Watermark embedder 17 then outputs watermarked bitstream layers 0-N. Subsequently, bitstream extractor 51 and decoder 33 operate equivalent to the description noted in reference to FIG. 7 for those units. In one embodiment, embedder 50 and extractor 51 may be implemented in processor 31 of FIG. 1.

Figure 10:
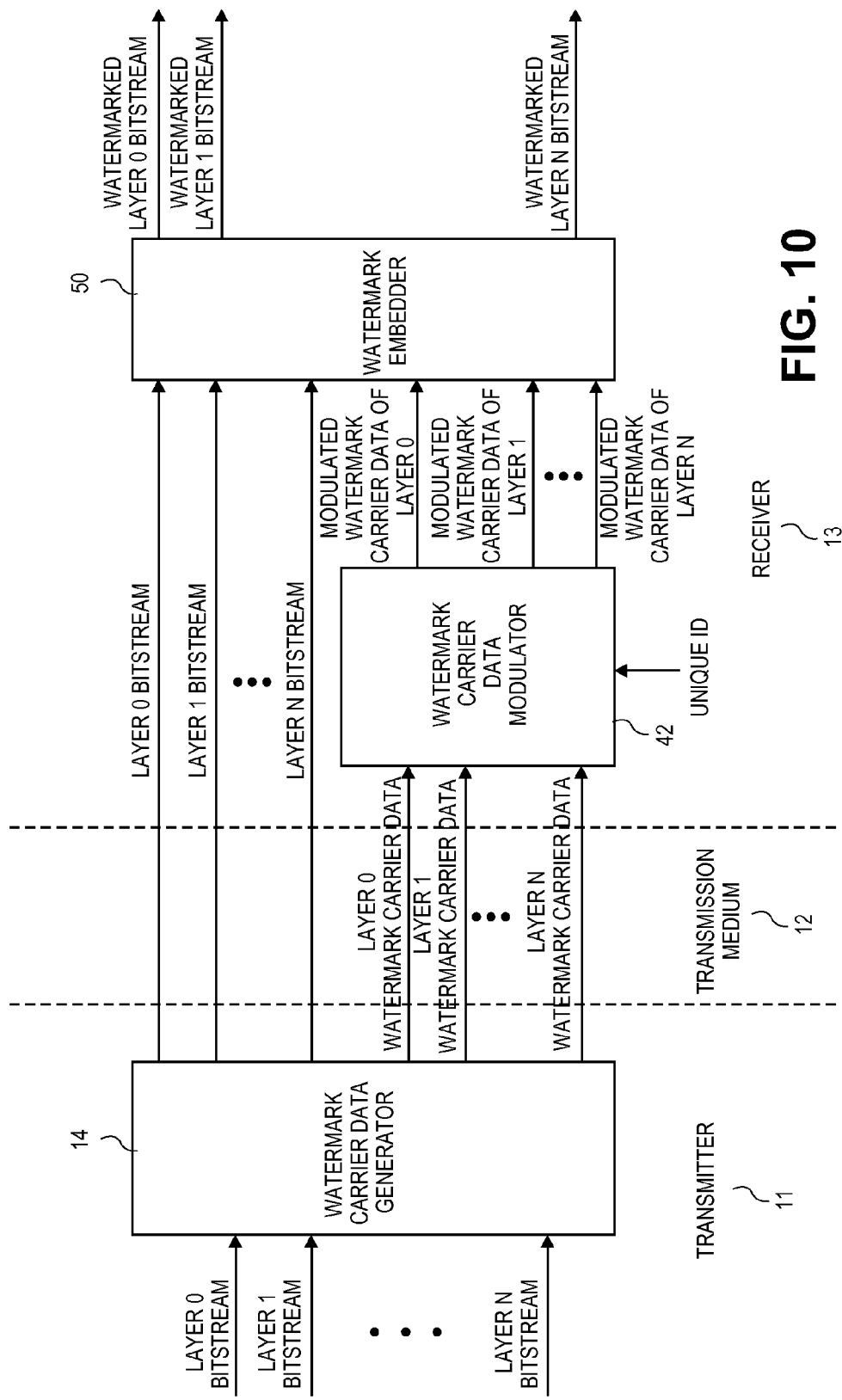
FIG. 10 is a functional block diagram showing one embodiment of using the hybrid technique of FIG. 9 to insert a unique ID in the bitstream along with the watermark.

FIG. 10 shows an application of this hybrid technique to embed a unique ID at the receiver, similar to the unique ID insertion described with reference to FIGS. 5 and 6. The block diagram of FIG. 10 is the same as a portion of FIG. 9, but with the inclusion of a watermark carrier data modulator 42. Watermark carrier data modulator 42 is placed upstream from watermark embedder 50 to insert the unique ID in all of the watermark carrier data received, before the watermark carrier data (now modulated with the unique ID watermark) is coupled to watermark embedder 50. Watermark carrier data modulator 42 modulates the unique ID with each watermark carrier data, so that the carrier data coupled to watermark embedder 50 includes both the watermark and the unique ID. The watermark and unique ID are now hierarchically processed by watermark embedder 50, pursuant to the description noted in reference to FIG. 9, with the exception that now both the watermark and the unique ID of a lower layer are compensated in each subsequent higher layer. The hierarchically watermarked and compensated bitstreams of layers 0-N are output from watermark embedder 50 and are subsequently operated on as described in reference to FIG. 9 by bitstream extractor 51 and decoder 33.

Thus, watermarking for compressed scalable coded bitstreams is described. Although the described techniques are more applicable to compressed bitstreams, it is readily adaptable to uncompressed bitstreams, as well as to other forms of data. One technique (technique A) is a two-step watermarking technique where layered watermark carrier data are generated for all layers at the transmitter, but the watermark is only embedded in the highest decoding layer at the receiver. A conditional access requirement ensures the proper correspondence between the watermark and the highest layer selected for decoding. A second technique (technique B) is a watermarking scheme where each higher layer first undoes (e.g. by compensation or removal) the watermark from the lower layer and then adds in its own layer's watermark. Since watermarks are present in all layers, conditional access is generally not needed. Furthermore, a hybrid technique utilizing both techniques A and B may be employed as well.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, as used herein, a processing device (or processor) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
   receiving a plurality of scalable coded bitstreams arranged in N hierarchical layers;
   receiving a plurality of watermark carrier data corresponding to respective layers of the plurality of bitstreams;
   selecting a particular layer M of the N hierarchical layers;
   processing, by a processor, the plurality of scalable coded bitstreams and the plurality of watermark carrier data to generate a layer M bitstream with a layer M watermark embedded in the layer M bitstream, along with generating a set of bitstreams of hierarchically lower layer or layers than layer M; and
   decoding the bitstream of the particular layer M with the embedded watermark for layer M, along with the set of bitstreams of hierarchically lower layer or layers without corresponding watermark for the hierarchically lower layer or layers.

2. The method of claim 1, wherein the plurality of scalable coded bitstreams includes video data.

3. The method of claim 1, wherein the plurality of scalable coded bitstreams includes audio data.

4. The method of claim 1, further including receiving information that specifies placement of the watermark in each layer.

5. The method of claim 1, wherein processing the plurality of scalable coded bitstreams and the plurality of watermark carrier data includes extracting the layer M bitstream and the set of bitstreams of hierarchically lower layer or layers from the plurality of scalable coded bitstreams, extracting the layer M watermark carrier data from the plurality of watermark carrier data and embedding the layer M watermark into the layer M bitstream.

6. The method of claim 1, further including inserting a unique identification data as additional watermarking in the layer M bitstream to uniquely identify a recipient of the scalable coded bitstreams.

7. The method of claim 5, further including inserting a unique identification data as additional watermarking to the plurality of watermark carrier data prior to extracting the layer M watermark carrier data to uniquely identify a recipient of the scalable coded bitstreams.

8. The method of claim 5, further including inserting a unique identification data as additional watermarking to the layer M watermark carrier data after extracting the layer M watermark carrier data to uniquely identify a recipient of the scalable coded bitstreams.

9. A method comprising:
   receiving a plurality of scalable coded bitstreams arranged in N hierarchical layers in which a corresponding watermark is included within bitstreams of each hierarchical layer, wherein a watermark of a particular bitstream layer is compensated in a bitstream of a next higher hierarchical layer to remove effects of a presence of the watermark of the particular layer when the next higher hierarchical layer is decoded;
   selecting a particular layer M of the N hierarchical layers;
   processing, by a processor, the plurality of scalable coded bitstreams to generate a layer M bitstream with a layer M watermark embedded in the layer M bitstream, along with generating a set of bitstreams of hierarchically lower layer or layers than layer M having effects of the presence of watermarks compensated; and
   decoding the bitstreams of the particular layer M with the embedded watermark for layer M, along with the set of bitstreams of hierarchically lower layer or layers having effects of the presence of watermarks compensated.

10. The method of claim 9, wherein the compensating includes re-encoding a portion of the bitstream of each next higher hierarchical layer to compensate for the watermark in each respective lower layer.

11. The method of claim 10, wherein there-encoding is performed on macro blocks associated with the watermark of a respective lower layer.

12. The method of claim 10, wherein the re-encoding includes utilizing inter-layer prediction between bitstreams of two adjacent layers.

13. An apparatus comprising:
   an extractor to receive a plurality of scalable coded bitstreams arranged in N hierarchical layers and to receive a plurality of watermark carrier data corresponding to respective layers of the plurality of bitstreams, in which the extractor also receives a signal to select a particular layer M of the N hierarchical layers, wherein the extractor extracts a layer M bitstream, extracts a layer M watermark carrier data and a set of bitstreams of hierarchically lower layer or layers than layer M;
   an embedder coupled to the extractor to receive the layer M bitstream and the layer M watermark carrier data and to embed a layer M watermark in the layer M bitstream; and
   a decoder coupled to receive the layer M bitstream with the embedded layer M watermark from the embedder and to receive the set of bitstreams of hierarchically lower layer or layers than layer M from the extractor and to decode the layer M bitstream with the embedded layer M watermark and the set of bitstreams of hierarchically lower layer or layers for decoding.

14. The apparatus of claim 13, further including a modulator coupled to the extractor to insert a unique identification data as additional watermarking to the plurality of watermark carrier data prior to extracting the layer M watermark carrier data to uniquely identify a recipient of the scalable coded bitstream.

15. The apparatus of claim 13, further including a modulator coupled to the extractor to insert a unique identification data as additional watermarking to the layer M watermark carrier data after extracting the layer M watermark carrier data to uniquely identify a recipient of the scalable coded bitstreams.

16. The apparatus of claim 13, wherein the extractor further receives information that specifies placement of the watermark in each layer.

17. An apparatus comprising:
a processor to receive a plurality of scalable coded bitstreams arranged in N hierarchical layers in which a corresponding watermark is included within bitstreams of each hierarchical layer, wherein a watermark of a particular bitstream layer is compensated in a bitstream of a next higher hierarchical layer to remove effects of a presence of the watermark of the particular layer when the next higher hierarchical layer is decoded, in which the processor selects a particular layer M of the N hierarchical layers to generate a layer M bitstream with a layer M watermark embedded in the layer M bitstream, along with generating a set of bitstreams of hierarchically lower layer or layers than layer M having effects of the presence of watermarks compensated; and
a decoder coupled to the processor to decode the bitstreams of the particular layer M with the embedded watermark for layer M, along with the set of bitstreams of hierarchically lower layer or layers having effects of the presence of watermarks compensated.

18. The apparatus of claim 17, wherein the processor performs compensation of a watermark by re-encoding a portion of the bitstream of each next higher hierarchical layer to compensate for the watermark in each respective lower layer.

19. The apparatus of claim 18, wherein the processor performs compensation by re-encoding macro blocks associated with the watermark of a respective lower layer.

20. The apparatus of claim 18, wherein the processor performs the re-encoding by utilizing inter-layer prediction between bitstreams of two adjacent layers.

* * * * *